(12) United States Patent
Gartner

(10) Patent No.: US 9,334,914 B2
(45) Date of Patent: May 10, 2016

(54) SHOCK ABSORBER WITH INERTANCE

(71) Applicant: Bill J. Gartner, Wyomissing, PA (US)

(72) Inventor: Bill J. Gartner, Wyomissing, PA (US)

( * ) Notice: Subject to any disclaimer, the term of this patent is extended or adjusted under 35 U.S.C. 154(b) by 119 days.

(21) Appl. No.: 13/867,784

(22) Filed: Apr. 22, 2013

(65) Prior Publication Data

US 2013/0319807 A1 Dec. 5, 2013

Related U.S. Application Data

(63) Continuation of application No. PCT/US2011/057167, filed on Oct. 20, 2011.

(60) Provisional application No. 61/394,978, filed on Oct. 20, 2010.

(51) Int. Cl.
| | | |
|---|---|---|
| *F16F 7/10* | (2006.01) | |
| *F16F 9/19* | (2006.01) | |
| *F16F 9/06* | (2006.01) | |
| *F16F 9/32* | (2006.01) | |

(52) U.S. Cl.
CPC ............... *F16F 7/1022* (2013.01); *F16F 9/06* (2013.01); *F16F 9/19* (2013.01); *F16F 9/3214* (2013.01); *F16F 2232/06* (2013.01)

(58) Field of Classification Search
USPC .................................. 188/129, 134, 267, 378
See application file for complete search history.

(56) References Cited

U.S. PATENT DOCUMENTS

| | | | |
|---|---|---|---|
| 1,952,902 A | 3/1934 | Barros | |
| 2,670,812 A | 3/1954 | Cuskie | |
| 2,732,039 A | 1/1956 | Funkhouser et al. | |
| 2,856,179 A * | 10/1958 | Hogan .......................... 188/129 |
| 3,225,870 A | 12/1965 | Heckethorn | |
| 3,532,187 A | 10/1970 | Herring, Jr. | |
| 3,623,574 A | 11/1971 | Gardner | |
| 3,741,867 A | 6/1973 | Fortescue | |
| 3,809,186 A | 5/1974 | Suozzo | |
| 3,876,040 A * | 4/1975 | Yang .............................. 188/378 |
| 3,931,961 A | 1/1976 | Fader et al. | |
| 3,945,474 A | 3/1976 | Palmer | |
| 3,983,965 A * | 10/1976 | Wright, Jr. .................... 188/380 |
| RE29,221 E | 5/1977 | Yang | |
| 4,044,865 A | 8/1977 | Tourunen | |
| 4,059,175 A | 11/1977 | Dressell, Jr. et al. | |
| 4,071,122 A | 1/1978 | Schupner | |

(Continued)

FOREIGN PATENT DOCUMENTS

| | | |
|---|---|---|
| DE | 2919899 A1 | 11/1980 |
| DE | 8117274 U1 | 9/1982 |

(Continued)

OTHER PUBLICATIONS

KIPO, Search Report & Written Opinion, 11 pages May 17, 2012.

(Continued)

*Primary Examiner* — Christopher Schwartz

(74) *Attorney, Agent, or Firm* — John V. Daniluck; Bingham Greenebaum Doll LLP

(57) ABSTRACT

A damper, especially for a suspension of a vehicle. The damper provides a reactive inertia force in response to movement of a shaft. In some embodiments, there is also a piston providing viscous damping. In some embodiments, the shaft of the damper telescopes with an internal shaft. The internal shaft and a coupling member coact to convert linear motion of the external shaft to an internal rotary motion.

34 Claims, 17 Drawing Sheets

(56) References Cited

U.S. PATENT DOCUMENTS

| | | | |
|---|---|---|---|
| 4,103,760 A | | 8/1978 | Yang |
| 4,105,098 A | * | 8/1978 | Klimaitis ............... 188/378 |
| 4,106,412 A | | 8/1978 | Farris et al. |
| 4,236,606 A | * | 12/1980 | Sunakoda et al. ............ 188/381 |
| 4,240,531 A | | 12/1980 | Poastema |
| 4,241,814 A | * | 12/1980 | Masclet ............... 188/266 |
| 4,275,802 A | * | 6/1981 | de Groot et al. ............ 188/134 |
| 4,276,967 A | * | 7/1981 | Dowell et al. ............... 188/134 |
| 4,286,693 A | | 9/1981 | Sulzer |
| 4,289,218 A | * | 9/1981 | Urano ............... 188/134 |
| 4,298,101 A | | 11/1981 | Dressell, Jr. et al. |
| 4,350,232 A | | 9/1982 | Yang |
| 4,440,273 A | | 4/1984 | Butler |
| 4,513,846 A | | 4/1985 | Yajima |
| 4,673,068 A | | 6/1987 | De Bruijn |
| 4,690,255 A | | 9/1987 | Heideman |
| 4,702,355 A | | 10/1987 | Heideman |
| 4,739,962 A | | 4/1988 | Morita et al. |
| 4,802,558 A | * | 2/1989 | Garnett ............... 188/134 |
| 4,969,632 A | | 11/1990 | Hodgson et al. |
| 5,018,606 A | | 5/1991 | Carlson |
| 5,050,712 A | | 9/1991 | Heideman |
| 5,161,653 A | | 11/1992 | Hare, Sr. |
| 5,174,552 A | | 12/1992 | Hodgson et al. |
| 5,197,692 A | | 3/1993 | Jones et al. |
| 5,257,680 A | | 11/1993 | Corcoran et al. |
| 5,316,114 A | | 5/1994 | Furuya |
| 5,337,864 A | | 8/1994 | Sjostrom |
| 5,396,973 A | | 3/1995 | Schwemmer et al. |
| 5,522,483 A | * | 6/1996 | Koch ............... 188/282.2 |
| 5,598,904 A | | 2/1997 | Spyche, Jr. |
| 5,775,469 A | | 7/1998 | Kang |
| 5,839,719 A | * | 11/1998 | Hosan et al. ............... 267/64.12 |
| 6,253,888 B1 | | 7/2001 | Bell et al. |
| 6,352,143 B1 | | 3/2002 | Niaura et al. |
| 6,378,558 B1 | | 4/2002 | Pohl et al. |
| 6,412,616 B1 | | 7/2002 | Allen |
| 6,913,127 B2 | | 7/2005 | Holiviers et al. |
| 6,974,002 B2 | | 12/2005 | Heideman |
| 7,316,303 B2 | | 1/2008 | Smith |
| 7,484,743 B2 | | 2/2009 | Gorodisher et al. |
| 7,631,736 B2 | | 12/2009 | Thies et al. |
| 2005/0211516 A1 | * | 9/2005 | Kondo et al. ............... 188/267 |
| 2007/0045918 A1 | | 3/2007 | Thornhill et al. |
| 2009/0108510 A1 | | 4/2009 | Wang et al. |
| 2009/0120745 A1 | | 5/2009 | Kondo et al. |
| 2009/0139225 A1 | | 6/2009 | Wang et al. |
| 2010/0148463 A1 | | 6/2010 | Wang et al. |

FOREIGN PATENT DOCUMENTS

| | | |
|---|---|---|
| DE | 3731479 A1 | 4/1989 |
| DE | 19727401 A1 | 1/1999 |
| DE | 19834316 C1 | 5/2000 |
| DE | 19954975 A1 | 3/2001 |
| DE | 10050159 A1 | 4/2002 |
| DE | 10252749 A1 | 6/2004 |
| DE | 102006009631 A1 | 12/2006 |
| EP | 0427046 A1 | 5/1991 |
| EP | 0542573 A2 | 5/1993 |
| EP | 0382171 B1 | 8/1994 |
| EP | 2060417 A1 | 5/2009 |
| FR | 2660386 A1 | 10/1991 |
| GB | 786839 | 11/1957 |
| GB | 2044882 A | 10/1980 |
| GB | 2298019 A | 8/1996 |
| GB | 2460860 A | 12/2009 |
| JP | 61286631 A | 12/1986 |
| JP | 06143969 A | 5/1994 |
| KR | 1020030004147 A | 1/2003 |
| KR | 1020070113213 | 11/2007 |
| KR | 100872536 | 12/2008 |
| WO | 0058642 A1 | 10/2000 |
| WO | 03005142 A | 1/2003 |
| WO | 2004053352 A1 | 6/2004 |
| WO | 2005121593 A1 | 12/2005 |
| WO | 2009060296 A2 | 5/2009 |
| WO | 2011015828 A1 | 2/2011 |
| WO | 2011089373 A1 | 7/2011 |
| WO | 2011095787 A | 8/2011 |
| WO | 0242659 A2 | 5/2012 |

OTHER PUBLICATIONS

WIPO, IPRP, 8 pages May 2, 2013.

* cited by examiner

SHOCK ABSORBER WITH INERTANCE

CROSS REFERENCE TO RELATED APPLICATION

This application continuation of International Patent Application Serial No. PCT/US11/57167, filed Oct. 20, 2011, which claims the benefit of priority to U.S. Provisional Patent Application Ser. No. 61/394,978, filed Oct. 20, 2010, both of which are incorporated herein by reference.

FIELD OF THE INVENTION

The present invention pertains to hydraulic dampers, and in particular to dampers for motor vehicle suspensions incorporating a movable weight that provides a forcing characteristic related to inertia.

SUMMARY OF THE INVENTION

One aspect of the present invention pertains to a hydraulic damper which includes a housing defining a cavity for hydraulic fluid. Some embodiments include a piston slidable within the cavity and including means for permitting restricted flow between the first volume and the second volume. Other embodiments include a first rod linearly slidable relative to the cavity and having an end extending outside of the cavity, the piston being attached to the rod, the first rod having an internal channel. Yet other embodiments include a second rod located at a position within the housing and adapted and configured to telescope with the first rod; and including means for converting linear motion of the first rod to rotary motion of an inertia weight.

Another aspect of the present invention pertains to a hydraulic damper including cylindrical housing defining a cavity for hydraulic fluid. Some embodiments include a piston slidable within the cavity and sealingly dividing the cavity into a first volume and a second volume. Other embodiments include a first rod slidable relative to the cavity and having an end extending outside of the cavity, the first rod having an internal channel. Yet other embodiments include a second rod fixedly attached within the housing and adapted and configured to be received within the internal channel. Still other embodiments include a coupling member rotatably attached to said first rod and said coupling member rotates in response to movement of said first rod relative to said housing.

Yet another aspect of the present invention pertains to a hydraulic damper, including a cylindrical housing containing hydraulic fluid. Other embodiments include a first rod linearly slidable relative to the cavity and having an end extending outside of the cavity. Yet other embodiments include a second rod rotatably within the housing and adapted and configured to be telescopically coupled to the first rod. Still other embodiments include a coupling member linearly moveable in fixed relationship with the first rod wherein the second rod rotates in response to movement of the first rod relative to the housing.

It will be appreciated that the various apparatus and methods described in this summary section, as well as elsewhere in this application, can be expressed as a large number of different combinations and subcombinations. All such useful, novel, and inventive combinations and subcombinations are contemplated herein, it being recognized that the explicit expression of each of these combinations is unnecessary.

BRIEF DESCRIPTION OF THE DRAWINGS

Some of the figures shown herein may include dimensions. Further, some of the figures shown herein may have been created from scaled drawings or from photographs that are scalable. It is understood that such dimensions, or the relative scaling within a figure, are by way of example, and not to be construed as limiting.

DESCRIPTION OF THE PREFERRED EMBODIMENT

Figure 1A:
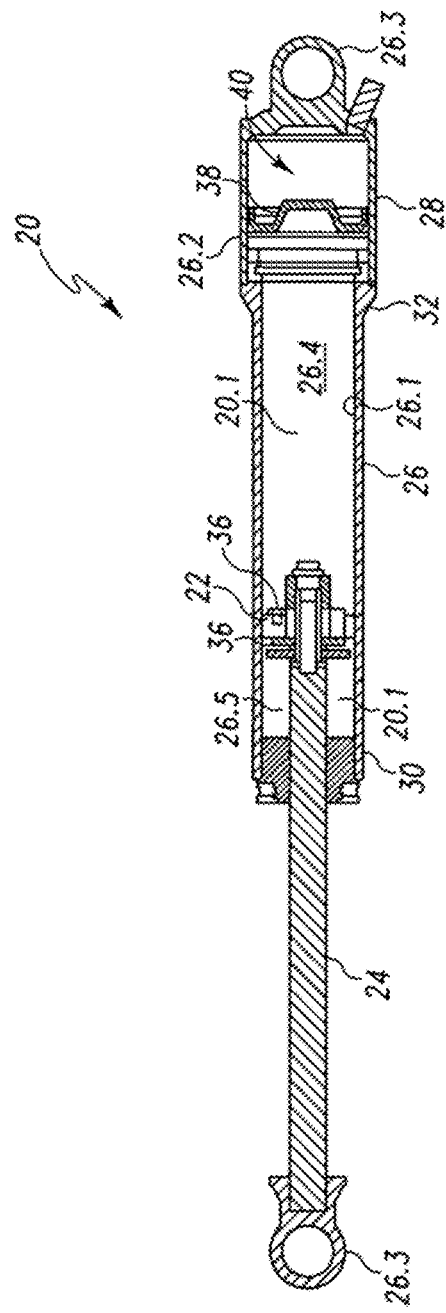
FIG. 1a is a cutaway view of a prior art shock absorber.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates. At least one embodiment of the present invention will be described and shown, and this application may show and/or describe other embodiments of the present invention. It is understood that any reference to "the invention" is a reference to an embodiment of a family of inventions, with no single embodiment including an apparatus, process, or composition that should be included in all embodiments, unless otherwise stated. Further, although there may be discussion with regards to "advantages" provided by some embodiments of the present invention, it is understood that yet other embodiments may not include those same advantages, or may include yet different advantages. Any advantages described herein are not to be construed as limiting to any of the claims.

The use of an N-series prefix for an element number (NXX.XX) refers to an element that is the same as the non-prefixed element (XX.XX), except as shown and described thereafter The usage of words indicating preference, such as "preferably," refers to features and aspects that are present in at least one embodiment, but which are optional for some embodiments. As an example, an element 1020.1 would be the same as element 20.1, except for those different features of element 1020.1 shown and described. Further, common elements and common features of related elements are drawn in the same manner in different figures, and/or use the same symbology in different figures. As such, it is not necessary to describe the features of 1020.1 and 20.1 that are the same, since these common features are apparent to a person of ordinary skill in the related field of technology. This description convention also applies to the use of prime ('), double prime ("), and triple prime ('") suffixed element numbers. Therefore, it is not necessary to describe the features of 20.1, 20.1', 20.1", and 20.1'" that are the same, since these common features are apparent to persons of ordinary skill in the related field of technology.

Although various specific quantities (spatial dimensions, temperatures, pressures, times, force, resistance, current, voltage, concentrations, wavelengths, frequencies, heat transfer coefficients, dimensionless parameters, etc.) may be stated herein, such specific quantities are presented as examples only, and further, unless otherwise noted, are approximate values, and should be considered as if the word "about" prefaced each quantity. Further, with discussion pertaining to a specific composition of matter, that description is by example only, and does not limit the applicability of other species of that composition, nor does it limit the applicability of other compositions unrelated to the cited composition.

Although various specific quantities (spatial dimensions, temperatures, pressures, times, force, resistance, current, voltage, concentrations, wavelengths, frequencies, etc.) may be stated herein, such specific quantities are presented as examples only. Further, any discussion pertaining to a specific composition of matter is by example only, and does not limit the applicability of other species of that composition, nor does it limit the applicability of other compositions unrelated to the cited composition.

This application incorporates by reference the discussion of inertial reactive forces from U.S. Pat. No. 7,316,303, issued Jan. 8, 2008 to Malcolm Clive Smith. This application incorporates by reference the following U.S. patent applications in their entirety: (1) U.S. patent application Ser. No. 12/061,568, filed Apr. 2, 2008, titled METHODS AND APPARATUS FOR DEVELOPING A VEHICLE SUSPENSION,; (2) U.S. patent application Ser. No. 12/144,530, filed Jun. 23, 2008, titled REGRESSIVE HYDRAULIC DAMPER,; and (3) U.S. patent application Ser. No. 12/352,279, filed Jan. 12, 2009, titled DUAL RATE GAS SPRING SHOCK ABSORBER,.

FIG. 1 shows a cross-sectional view of a prior art shock absorber 20. A main piston 22 is coupled to a moveable rod 24, piston 22 being slidably received within the inner diameter 26.1 of a main cylinder 26. Piston 22 is retained on the end of rod 24 by a coupling nut 24.2. Main piston 22 generally subdivides the internal volume of cylinder 26 into a compression volume 26.4 located between piston 22 and the compression end 28 of shock 20, and a second rebound volume 26.5 located between piston 22 and the rebound end 30 of shock 20. The movement of piston 22 and rod 24 toward rebound end 32 results in a reduction in the size of compression volume 26.1, and the subsequent flow of hydraulic fluid 20.1 through a compression flowpath 32 in piston 22 and into the simultaneously enlarging rebound volume 26.5. Likewise, movement of piston 22 toward rebound end 30 of shock 20 results in the flow of hydraulic fluid 20.1 through a rebound flowpath 34 in piston 22 and into the simultaneously enlarging compression volume 26.4.

In order to compensate for changes in the density of hydraulic fluid 20.1, shock absorber 20 includes a nitrogen chamber separated by a reservoir piston 38 from the fluid-wetted volume of cylinder 26.

Shock absorber 20 is typically used with the suspension of a vehicle. Rod 24 includes a first suspension attachment 26.3, and end cap 26.2 of cylinder 26 includes a second suspension attachment 26.3. Rod 24 extends through an end cap and rod seal assembly 26.7 that is attached to one end of cylinder 26. End cap 26.7 preferably includes one or more of resilient seals that seal against the outer diameter of rod 24 and one or more wipers designed to keep any dirt or contaminants on the rod outer surface from reaching the seals. These suspension attachments 26.3 permit the pivotal connection of shock absorber 20 to a portion of the vehicle suspension on one end, and on the other end to a portion of the vehicle frame. It is well known to use shock absorbers on many types of vehicles, including motorcycles, buses, trucks, automobiles, and airplanes. Further, although shock absorber 20 has been referred to for being used on a vehicle, shock absorbers are also known to be used in other applications where it is beneficial to dampen the movement of one object relative to another object, such as dampers for doors.

Compression flowpath 32 includes a fluid passageway interconnecting volumes 26.4 and 26.5 with a one-way valve in the flowpath 32. This one-way valve can be one or more annular shims which are prevented from flexing in one direction (and thus substantially restricting flow), but able to flex in a different direction (and thus allow flow in this opposite direction). Likewise, rebound flowpath 34 provides fluid communication between volumes 26.4 and 26.5 through a one-way valve. Often, the one-way valve of the compression flowpath 32 has different characteristics than the one-way valve of rebound flowpath 34.

Figure 1B:
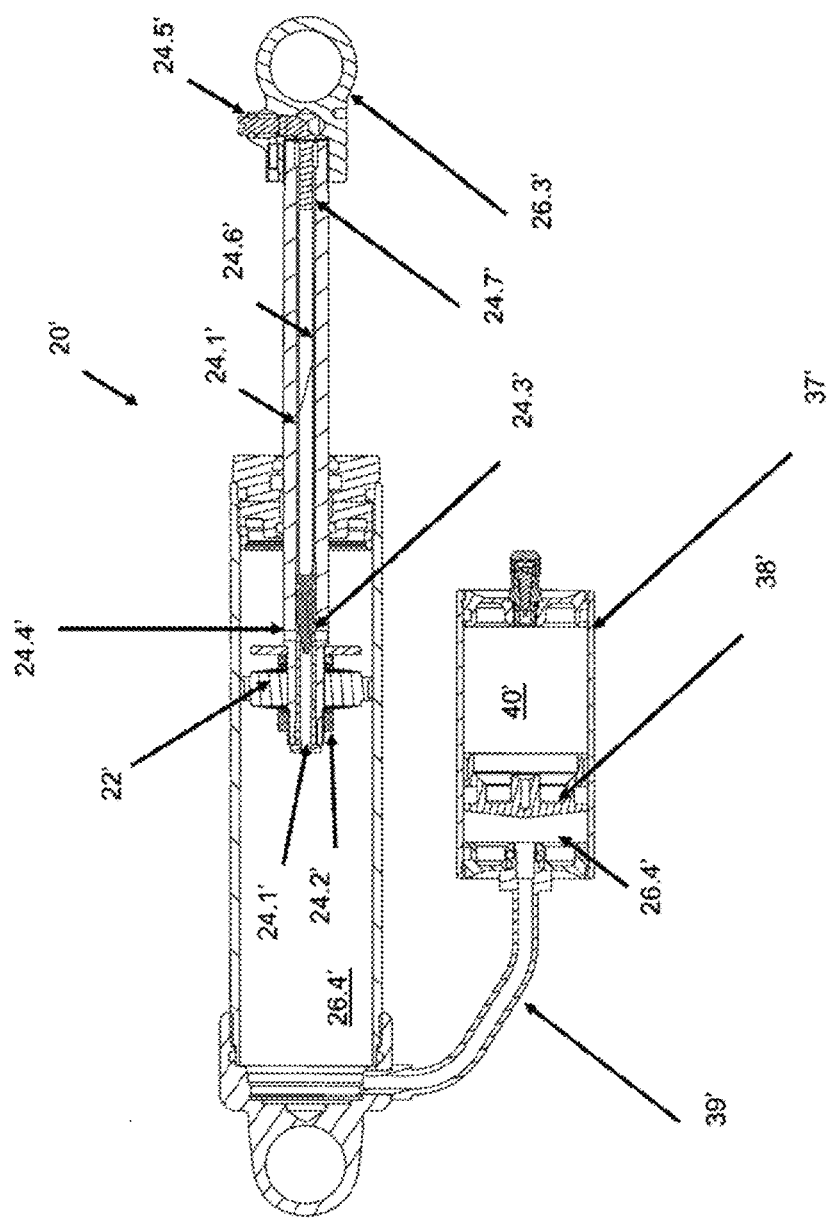
FIG. 1b is a cutaway view of another prior art shock absorber.

FIG. 1*b* shows a cross-sectional view of a second prior art shock absorber 20'. Shock absorber 20' includes a second, separate cylinder 37' which includes gas reservoir 40'. A piston 38' slidably received within cylinder 37' separates gas volume 40' from compression volume 26.4'. An external fluid connection 39' interconnects the hydraulic fluid end of piston 37' with the compression end of shock absorber 20'. Cylinder 37' includes a gas port in one end of cylinder 37' for entry or removal of nitrogen.

Shock absorber 20' includes means for varying the fluid resistance of a flowpath interconnecting compression volume 26.4' and rebound volume 26.5'. Rod 24' includes an internal passage 24.1' that extends out one end of shaft 24', and extends in the opposite direction towards attachment 26.3'. The open end of internal passage 24.1' is in fluid communication with one or more orifices 24.4' that extend from internal passage 24.1' to rebound volume 26.5'. The flow of fluid through this internal passageway between the compression and rebound volumes is restricted by a metering needle 24.3' received within internal passage 24.1'. The position of metering needle 24.3' can be altered by a pushrod 24.6' also extending within internal passage 24.1'. Push rod 24.6' includes an end 24.7' that is adapted and configured to mate with an internal adjustment screw 24.5'. The inward adjustment of screw 24.5' acts on the angled interface to push rod 24.6' and adjustment needle 24.3' toward a position of increased resistance in the internal flowpath.

Figure 1C:
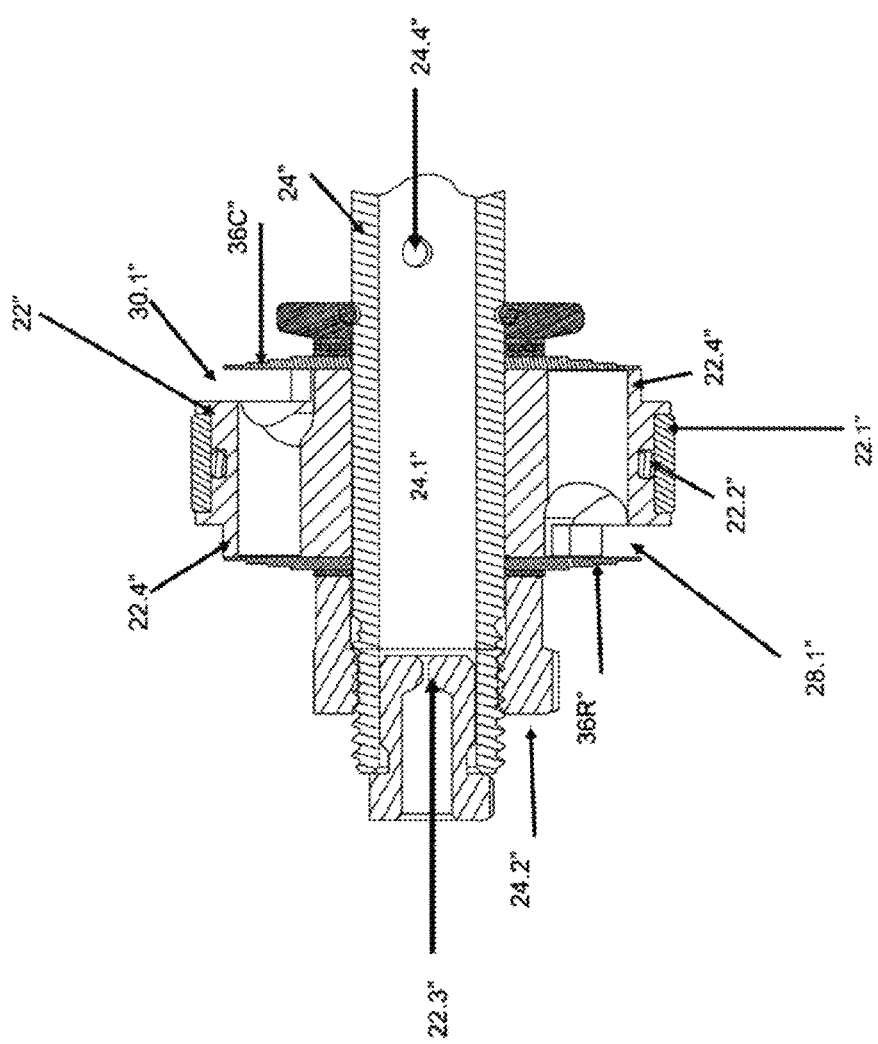
FIG. 1c is a cutaway view of a portion of another prior art shock absorber.

FIG. 1c is a cross sectional view of a portion of another prior art shock absorber. The apparatus in FIG. 1c shows a piston 22" coupled to a shaft 24" by a coupling nut 24.2". Shaft 24" includes an internal flowpath from orifice 22.3" through internal passage 24.1" and into shaft orifice 24.4". This internal flowpath bypasses piston 22".

Piston 22" includes a pair of shim sets 36", each shim set shown including 4 individual washers. During operation in compression (i.e., movement in FIG. 1c toward the left) fluid is able to freely enter compression flowpath 28.1". However, fluid is unable to exit through flowpath 28.1" and into the rebound side of the shock absorber unless fluid pressure is sufficiently great to bend the periphery shim stack 36C" away from the shim edge support 29.4" of piston 22". During operation in rebound, (i.e., movement in FIG. 1c toward the right) fluid is able to freely enter compression flowpath 30.1". However, fluid is unable to exit through flowpath 30.1" and into the compression side of the shock absorber unless fluid pressure is sufficiently great to bend the periphery shim stack 36R" away from the shim edge support 29.4" of piston 22".

A resilient seal 22.1" substantially seals the compressive side of piston 22" from the rebound side of piston 22". An energizing backup seal 22.2" urges seal 22.1" outwardly into contact with the inner wall of the cylinder.

Figure 2A:
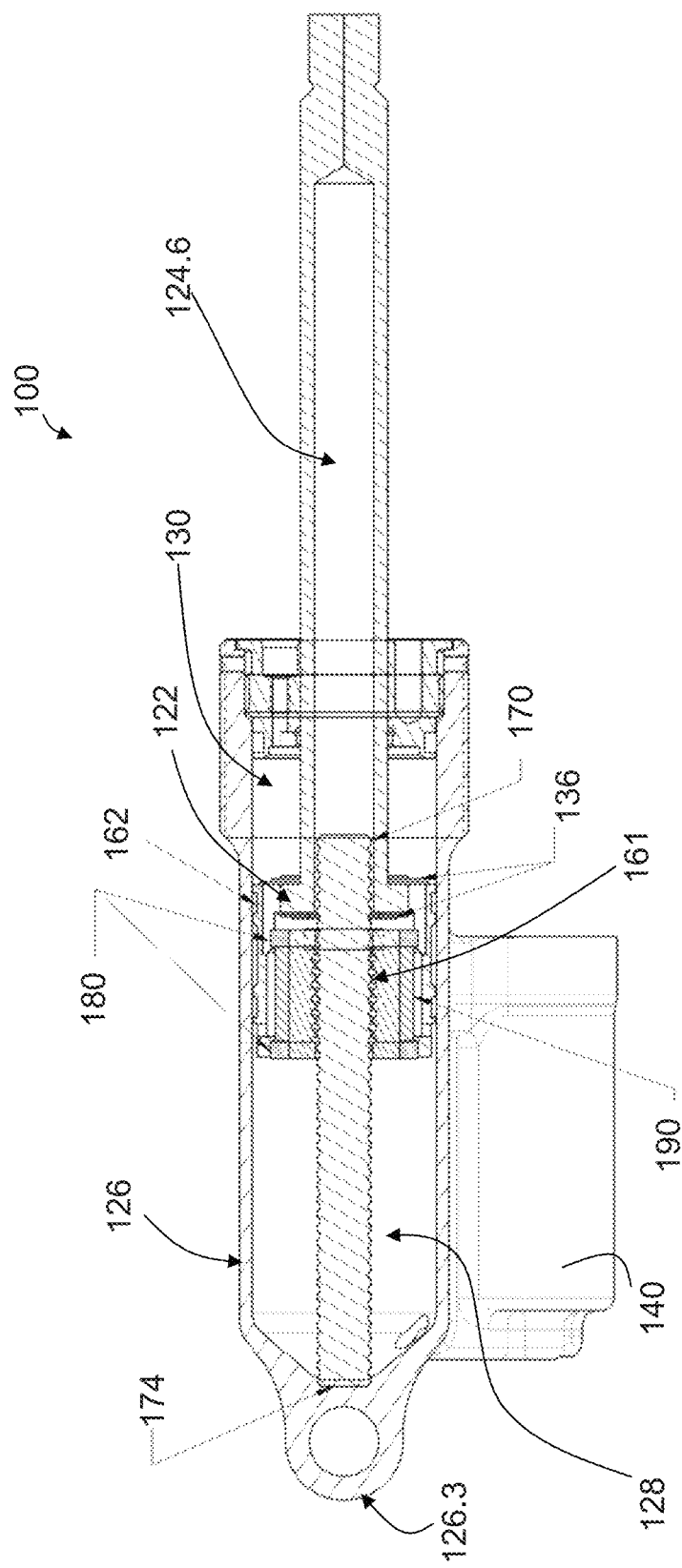
FIG. 2A is a side elevational cutaway view of a suspension damper according to one embodiment of the present invention.
Figure 2B:
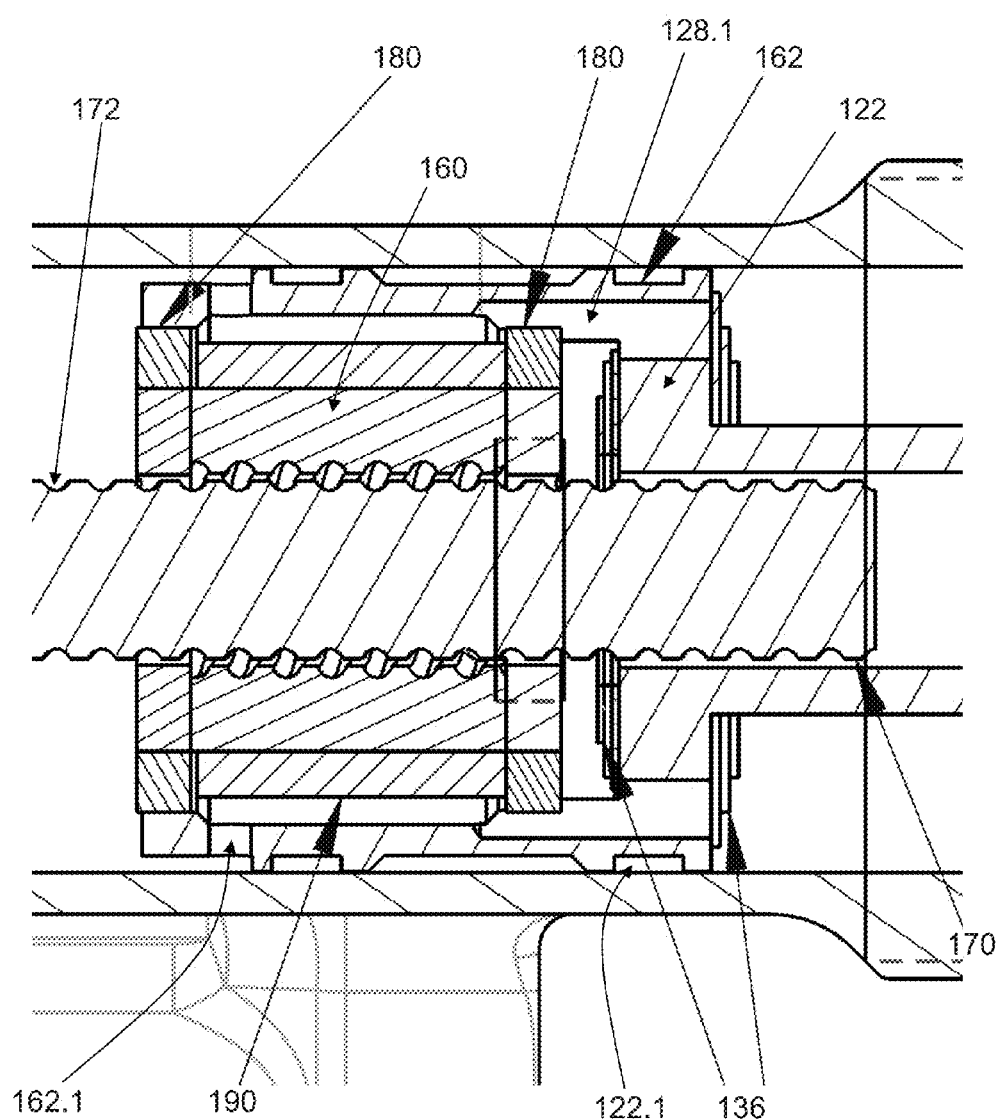
FIG. 2B is an enlargement of a portion of the apparatus of FIG. 2.
Figure 3:
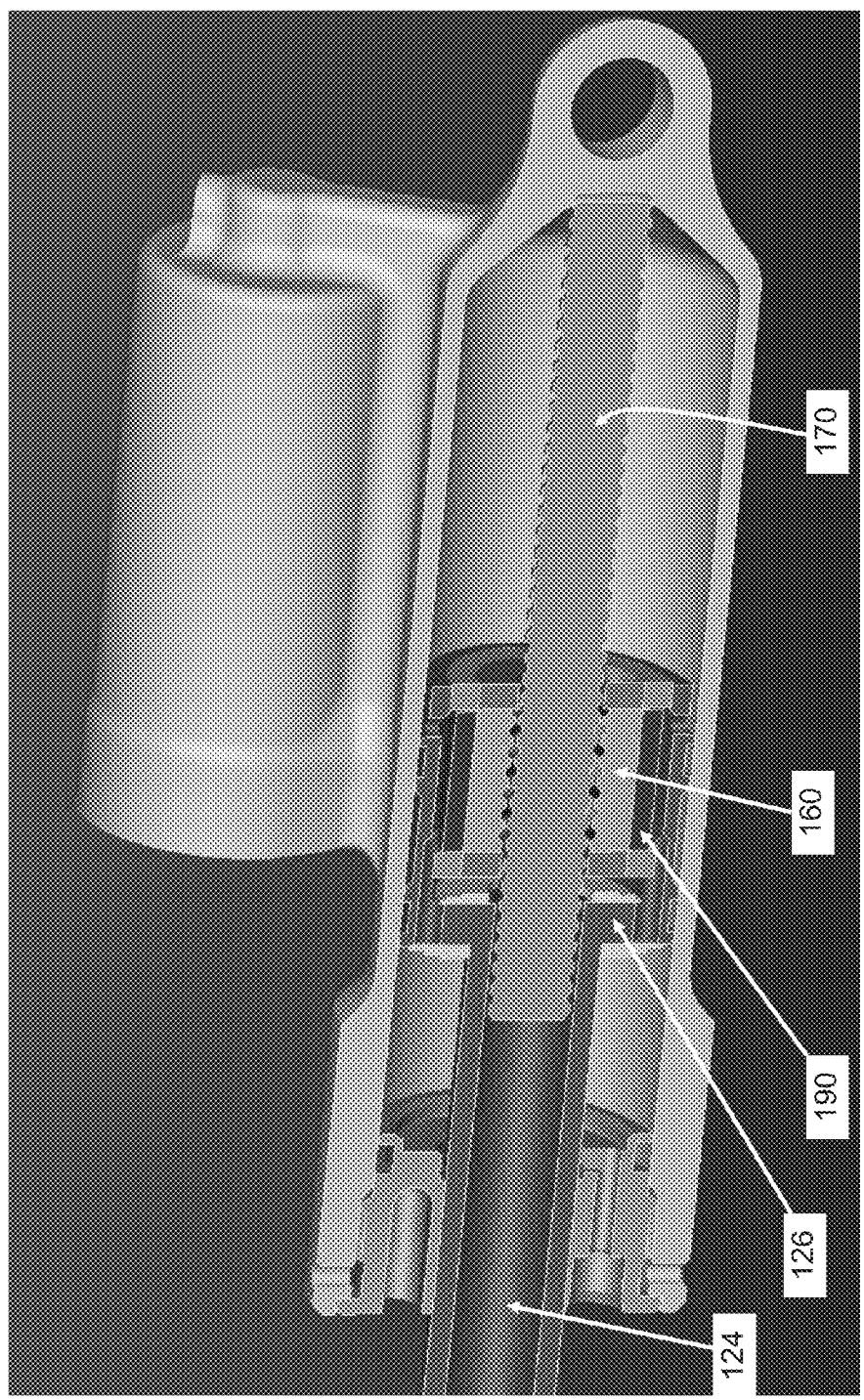
FIG. 3 is a perspective cutaway solid CAD model depiction of the damper of FIG. 2A.

FIGS. 2A, 2B, and 3 depict various views of a shock absorber 100 according to one embodiment of the present invention. Shock 100 includes a damping piston 122 attached to a rod 124 that is received within the inner diameter of a cylindrical housing 126 filled with hydraulic fluid. In some embodiments, there is also a nitrogen chamber 140 that includes hydraulic fluids in fluid communication with hydraulic fluid within cylinder 126. Preferably, piston 122 includes one or more means for permitting restrictive flow across piston 122, such as one or more shimmed one-way valves 136, one or more fixed restrictions, poppets, or the like.

Rod 124 includes an internal passage 124.6 that is adapted and configured to receive within it a second rod 170. As shock absorber 100 is compressed (i.e., movement of rod 124 toward the left, as seen in FIG. 2A), rod 170 telescopes within passage 124.6. Rod 170 is rigidly attached to cylinder 126 at distal end 174. Rod 170 is part of a means for converting linear motion into rotary motion, this linear motion being the movement of rod 124 relative to rod 170. In some embodiments, rod 170 is a ballscrew rod 170 that includes a spiral groove 172 that guides the motion of a coupling member 160. Ball screw shaft 170 is fastened to the damper body both axially and torsionally.

As best seen in 2B, a piston 122 is coupled to the internal end of rod 124. It is understood that portions of piston 122 can be integral with rod 124, or separate and coupled to the end of rod 124. Piston 122 includes a plurality of passageways such as compression flowpath 128.1 that permits flow of hydraulic fluid from compression volume 128 to rebound volume 130. Piston assembly 122 includes a housing 162 that can support seals 122.1 and/or piston guide bushings.

Housing 162 further supports one or more rotating weights 190 and a coupling member 160. A pair of roller bearings 180 has outer races coupled to carrier 162, and inner races that are coupled to a coupling member 160. Coupling member 160 is rotatably supported by bearing 180 and rotates relative to shaft 170. In some embodiments, coupling member 160 is a ballscrew nut that includes a spiral groove similar to that of groove 172. In some embodiments, the coupling member 160 and shaft 172 jointly form a spiraling interface into which a plurality of ball bearings 161 are provided. In some embodiments, balls 161 recirculate from one end to the other end of the coupling member 160 (not shown). Coupling member 160 and shaft 170 combine to provide a means for converting the relative linear motion to rotational motion of coupling member 160.

As shaft 122 moves linearly relative to shaft 170, coupling member 160 (supported by housing 162) likewise moves relative to shaft 170. Preferably, one of shaft 170 or member 160 include a helical guide (such as, but not limited to, spiral groove 172). Because of the helical pitch (revolutions of spiral per inch), the relative translational motion between piston carrier 162 and shaft 170 results in spinning of coupling member 160 about the longitudinal axis of shaft 170 (which is coincident with the longitudinal axis of cylinder 126). In some embodiments, it is desired that the spinning of coupling member 160 impart an inertially-reactive force in response to the movement of shaft 124. This inertial reaction is provided both in linear and rotational terms by coupling member 160. The rotational inertia is a function of both the mass that is spinning, and the distance of the mass from the rotational axis.

Therefore, in those embodiments in which it is desired to have an increased rotational inertia effect, one or more weights 190 are attached to coupling member 160, and rotate in unison with coupling member 160. Since these weights 190 are coupled to the outer diameter of coupling member 160, weights 190 thereby provide an inertial reaction at a greater radius, which increase the overall rotational moment of inertia. Further, weights 190 can be fabricated from heavier materials that may be unsuitable for an interface with the shaft, including materials such as brass and tungsten.

Figure 4:
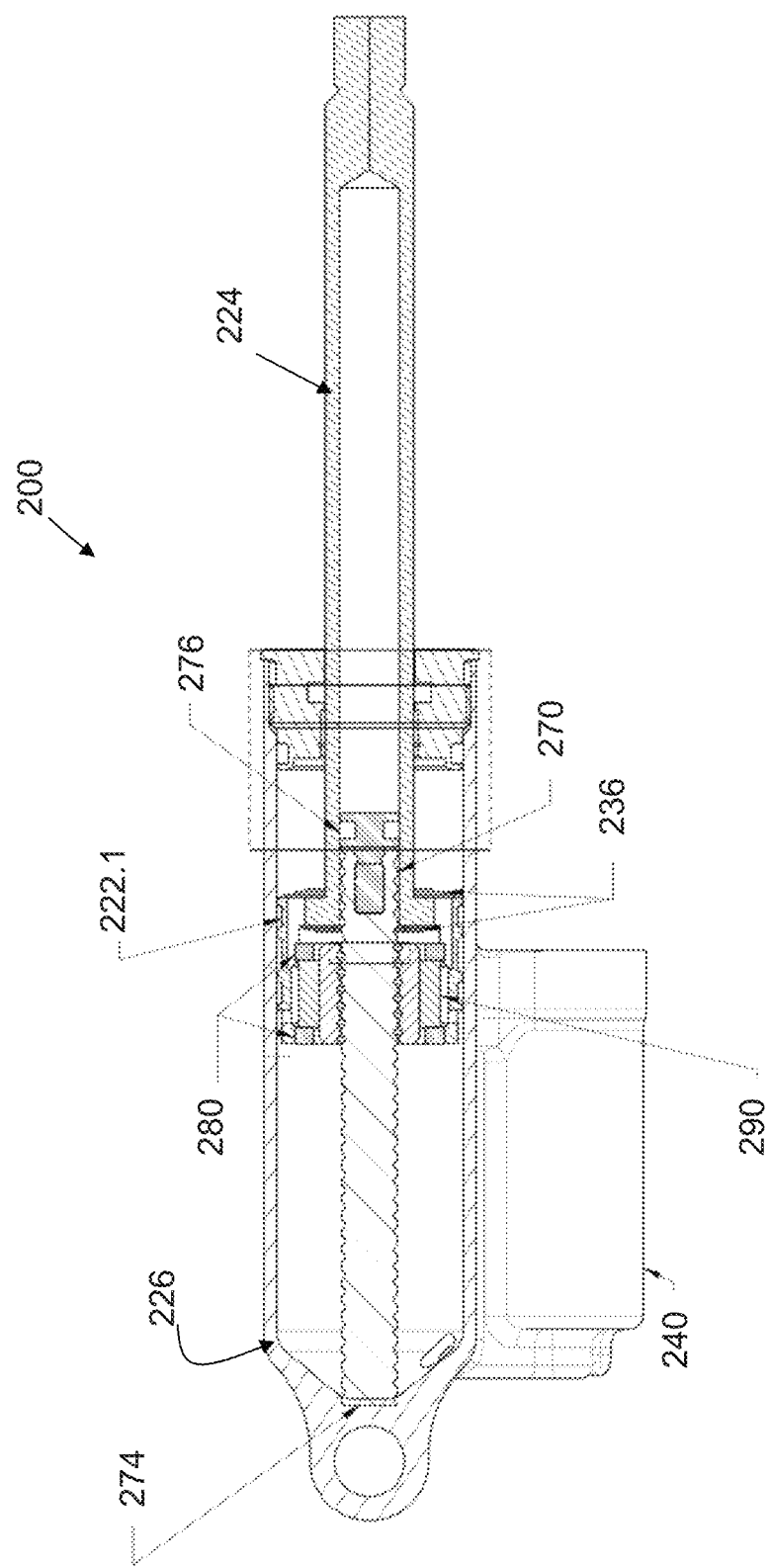
FIG. 4 is a side elevational cutaway view of a suspension damper according to another embodiment of the present invention.
Figure 5:
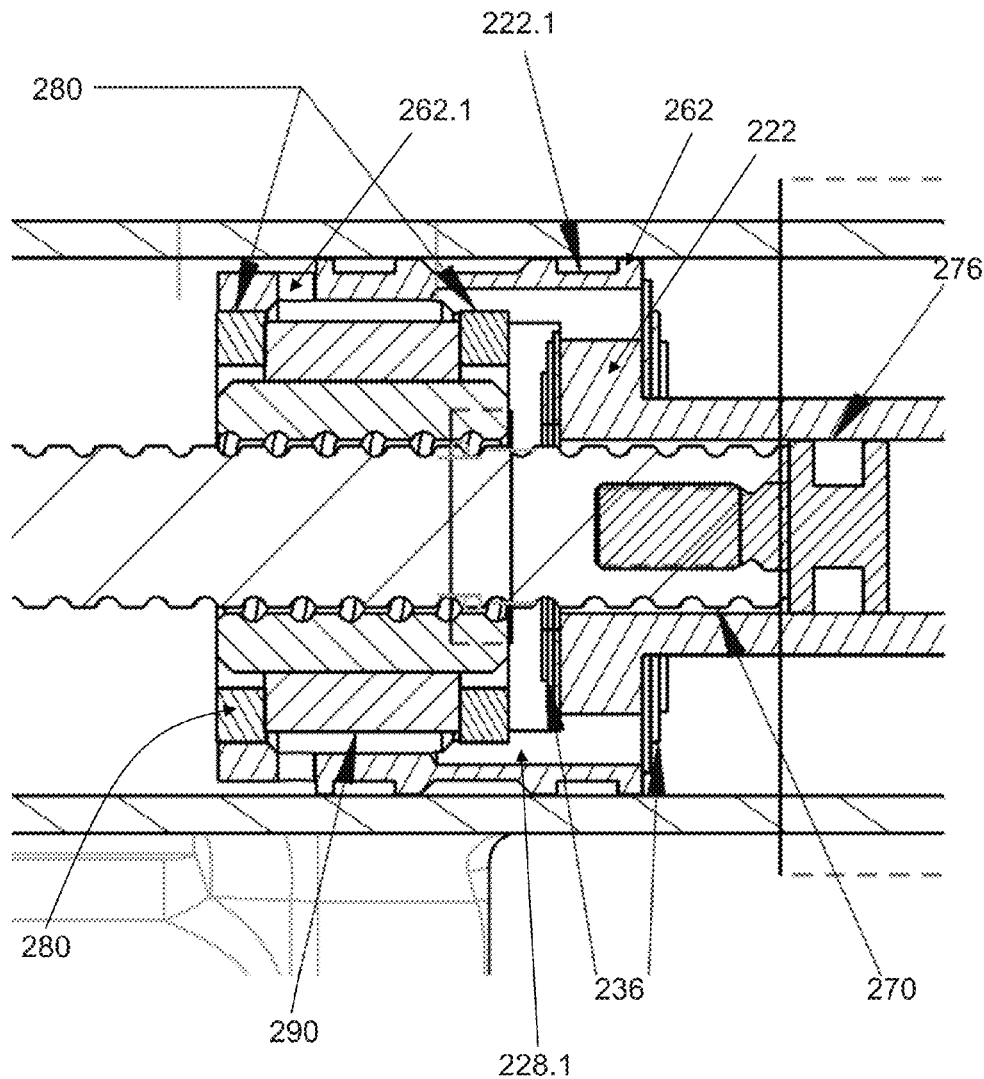
FIG. 5 is an enlargement of a portion of the apparatus of FIG. 4.

FIGS. 4 and 5 depict various views of a shock absorber 200 according to another embodiment of the present invention. Shock 200 includes a damping piston 222 attached to a rod 224 that is received within the inner diameter of a cylindrical housing 226 filled with hydraulic fluid. In some embodiments, there is also a nitrogen chamber 240 that includes hydraulic fluids in fluid communication with hydraulic fluid within cylinder 226. Fluid reservoir 240 can be used to accept the shaft displaced fluid. This could be a piggyback or inline version. Preferably, piston 222 includes one or more means for permitting restrictive flow across piston 222, such as one or more shimmed one-way valves 236, one or more fixed restrictions, poppets, or the like.

Rod 224 includes an internal passage 224.6 that is adapted and configured to receive within it a second rod 270. As shock absorber 200 is compressed, rod 270 telescopes within passage 224.6. Rod 270 is rigidly attached to cylinder 226 at distal end 274. Rod 270 is part of a means for converting linear motion into rotary motion, this linear motion being the movement of rod 224 relative to rod 270. In some embodiments, rod 270 is a ballscrew rod 270 that includes a spiral groove 272 that guides the motion of a coupling member 260. Ball screw shaft 270 is fastened to the damper body both axially and torsionally. Shaft 270 includes a sealable plug 276 that substantially prevents hydraulic fluid from entering the internal passage of shaft 224. In some embodiments there is also a vent drilled into the shaft. If no seal is used, the shaft is filled with fluid.

A piston 222 is coupled to the internal end of rod 224. It is understood that portions of piston 222 can be integral with rod 224, or separate and coupled to the end of rod 224. Piston 222 includes a plurality of passageways such as compression flowpath 228.1 that permits flow of hydraulic fluid from compression volume 228 to rebound volume 230. Piston assembly 222 includes a housing 262 that can support seals 222.1 and/or piston guide bushings.

Housing 262 further supports one or more rotating weights 290 and a coupling member 260. A pair of roller bearings 280 has outer races coupled to carrier 262, and inner races that are coupled to a coupling member 260. Coupling member 260 is rotatably supported by bearing 280 and rotates relative to shaft 270. In some embodiments, coupling member 260 is a ballscrew nut that includes a spiral groove similar to that of groove 272. In some embodiments, the coupling member 260 and shaft 272 jointly form a spiraling interface into which a plurality of ball bearings 261 are provided. In some embodiments, balls 261 recirculate from one end to the other end of the coupling member 260 (not shown). Coupling member 260 and shaft 270 combine to provide a means for converting the relative linear motion to rotational motion of coupling member 260.

As shaft 222 moves linearly relative to shaft 270, coupling member 260 (supported by housing 262) likewise moves relative to shaft 270. Preferably, one of shaft 270 or member 260 include a helical guide (such as, but not limited to, spiral groove 272). Because of the helical pitch (revolutions of spiral per inch), the relative translational motion between piston carrier 262 and shaft 270 results in spinning of coupling member 260 about the longitudinal axis of shaft 270 (which is coincident with the longitudinal axis of cylinder 226). In some embodiments, it is desired that the spinning of coupling member 260 impart an inertially-reactive force in response to the movement of shaft 224. This inertial reaction is provided both in linear and rotational terms by coupling member 260. The rotational inertia is a function of both the mass that is spinning, and the distance of the mass from the rotational axis.

Therefore, in those embodiments in which it is desired to have an increased rotational inertia effect, one or more weights 290 are attached to coupling member 260, and rotate in unison with coupling member 260. Since these weights 290 are coupled to the outer diameter of coupling member 260, weights 290 thereby provide an inertial reaction at a greater radius, which increase the overall rotational moment of inertia. Further, weights 290 can be fabricated from heavier materials that may be unsuitable for an interface with the shaft, including materials such as brass and tungsten.

Figure 6:
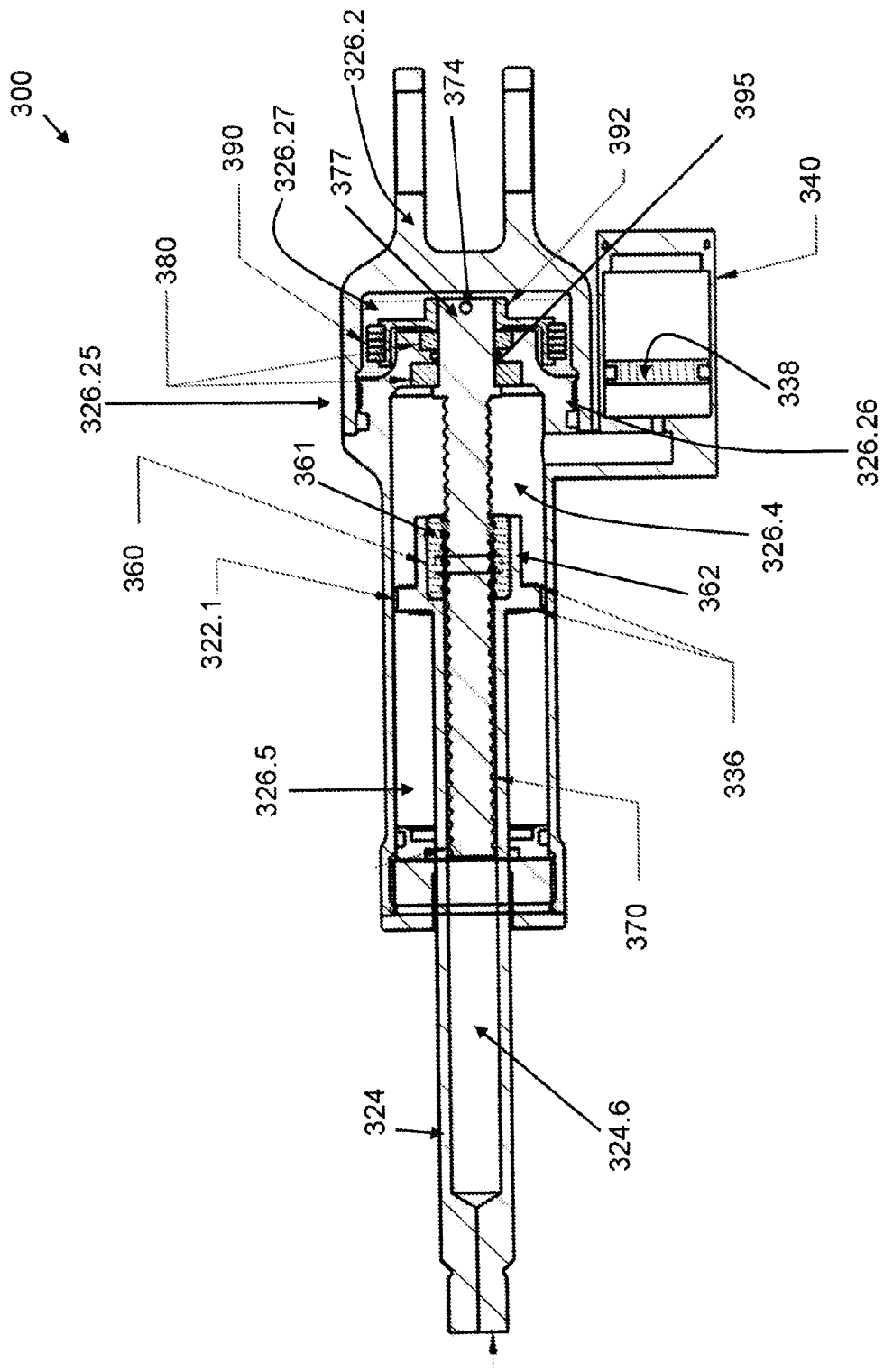
FIG. 6 is a side elevational cutaway view of a suspension damper according to another embodiment of the present invention. This figure shows a rotational weight cantilevered from a pair of roller bearings, and able to rotate within a chamber which, in some embodiments, does not include hydraulic fluid. In yet other embodiments, hydraulic fluid can surround the rotating weights to add viscous drag during rotation, and further, in some embodiments to provide lubrication to one or both of the roller bearings.

FIG. 6 shows a suspension damper 300 according to another embodiment of the present invention. Damper 300 includes means for converting linear motion of rod 324 into rotary motion weights 390 and a weight carrier 392 according to another embodiment of the present invention.

In some embodiments, a piston 322 having a seal or guide 322.1 and means for permitting restricted flow of hydraulic fluid is coupled to a rod 324. Preferably, seal 322.1 divides the internal cavity of cylinder 324 into a rebound volume 326.5 and a compression volume 326.4. As piston 322 strokes within the interior cylinder 326, fluid flows from one side of piston 322 to the other side of piston 322 in a manner that provides a predetermined amount of viscous damping.

Further coupled to shaft 324 is a housing 362 that contains within it a coupling member 360, which is keyed to housing 362 so as to discourage any relative rotational movement therebetween. Coupling member 360 includes means for converting linear relative motion of shaft 324 relative to shaft 370 into rotational motion of a carrier 392. In some embodiments, rod 370 is a ballscrew rod, having formed on its outer diameter a hardened, spiral groove adapted and configured to receive within it ball bearings. Rod 324 includes an internal passage 324.6 that is adapted and configured to telescopically receive shaft 370. In some embodiments, the interface between shaft 370 and passage 324.6 is unsealed, such that passage 324.6 is wetted with hydraulic fluid. However, yet other embodiments include a plug at the telescoping end of rod 370 that discourages the flow of hydraulic fluid into passage 324.6.

As shaft 324, piston 322, and housing 362 translate within cylinder 324, shaft 370 and coupling member 360 coact to form a sliding interface that converts the relative linear movement of member 360 and rod 370 into rotational movement of rod 370. In some embodiments, this is accomplished by having a coupling member 360 that is a ballscrew nut, and further placing a plurality of recirculating ball bearings 361 at the interface between member 360 and rod 370.

An end 374 of shaft 370 extends through and past a pair of bearings 380. Shaft 370 is locked in position relative to a carrier 392 by a pin 377. A plurality of washer-like weights 390 are coupled by a keyway onto carrier 392. Shaft end 374, carrier 392, and weights 390 rotate in unison.

Rod 370 is supported at one end by a pair of roller bearings 380 that transmit axial loads to cylinder 362 but which permit shaft 370 to freely rotate. In some embodiments, a seal 395 is placed inbetween first and second roller bearing 380, such that one bearing is wetted with hydraulic fluid, and the other bearing is not. In yet other embodiments, seal 395 is located inbetween the weight carrier 392 and the adjacent bearing 380, such that both bearings are wetted. In either of the two aforementioned configurations, the carrier 392 rotates within a chamber 326.27 of endcap 326 that is not provided with hydraulic fluid from the interior of cylinder 326. In such embodiments, weights 390 and carrier 392 are free to rotate without appreciable viscous drag caused by interaction with hydraulic fluid. However, it is recognized that chamber 326.27 may have some hydraulic fluid within it during operation.

Shock 300 includes means for repeatably and readily changing the inertial weights 390. Weights 390 and carrier 392 rotate within a chamber 326.27 formed by endcap 326.2. Endcap 326.2 is coupled by threads 326.26 to cylinder 326. Further, a seal such as an O-ring 326.25 seals the inner diameter of cap 326.2 to an inner diameter of cap 326.2 to an outer diameter of cylinder 322.6. In some embodiments, endcap 326.2 can be threadably disengaged from cylinder 326, which provides open access to carrier 392, weights 390, and shaft 370. Carrier 392 can be removed from the rotatable end 374 of shaft 370, and the number of weights on that carrier can be changed, or in some embodiments, replaced with a carrier carrying a different number of weights.

Figure 7:
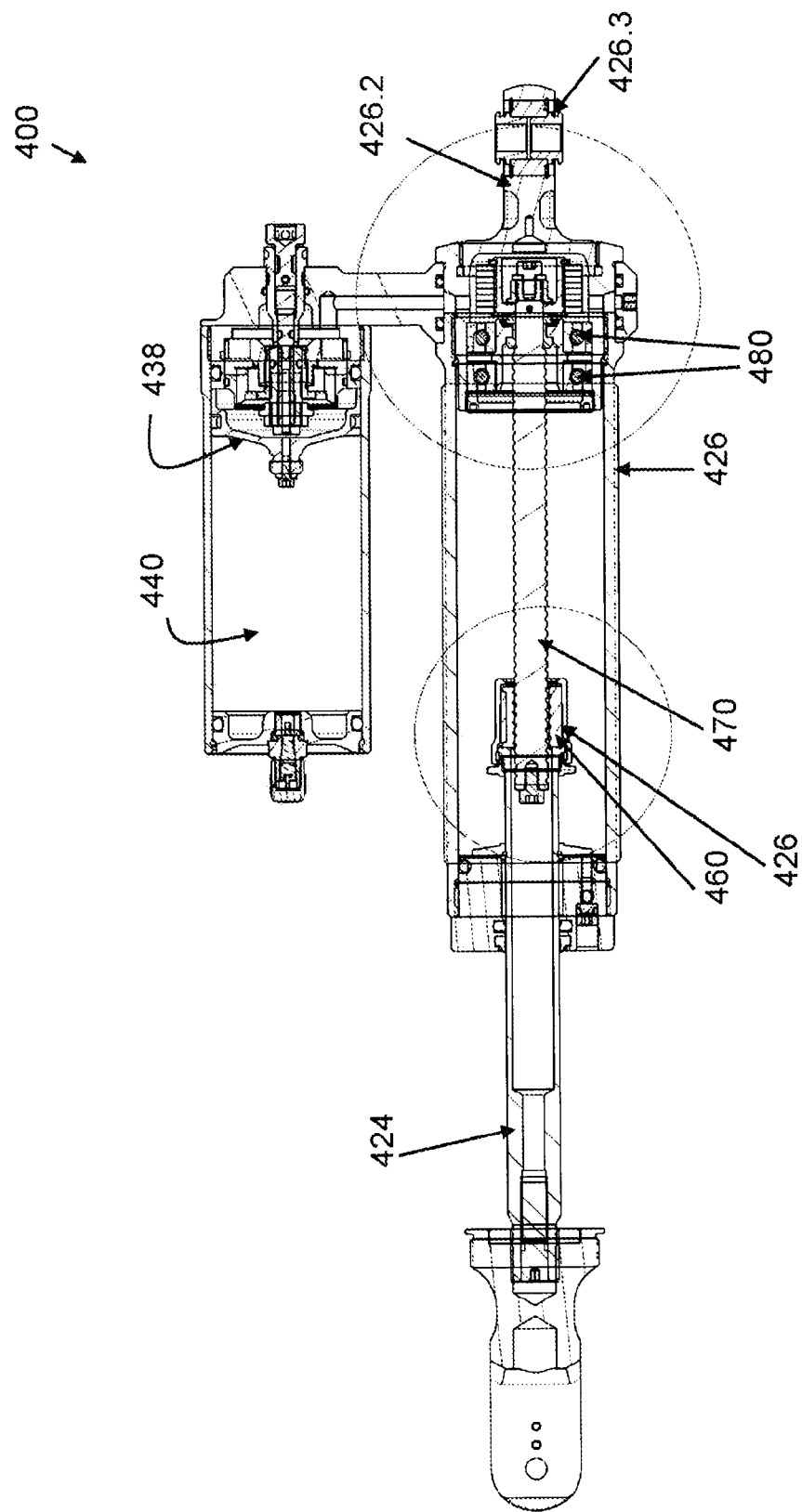
FIG. 7 is a side cutaway view taken along the centerline of a suspension damper according to another embodiment of the present invention.
Figure 8:
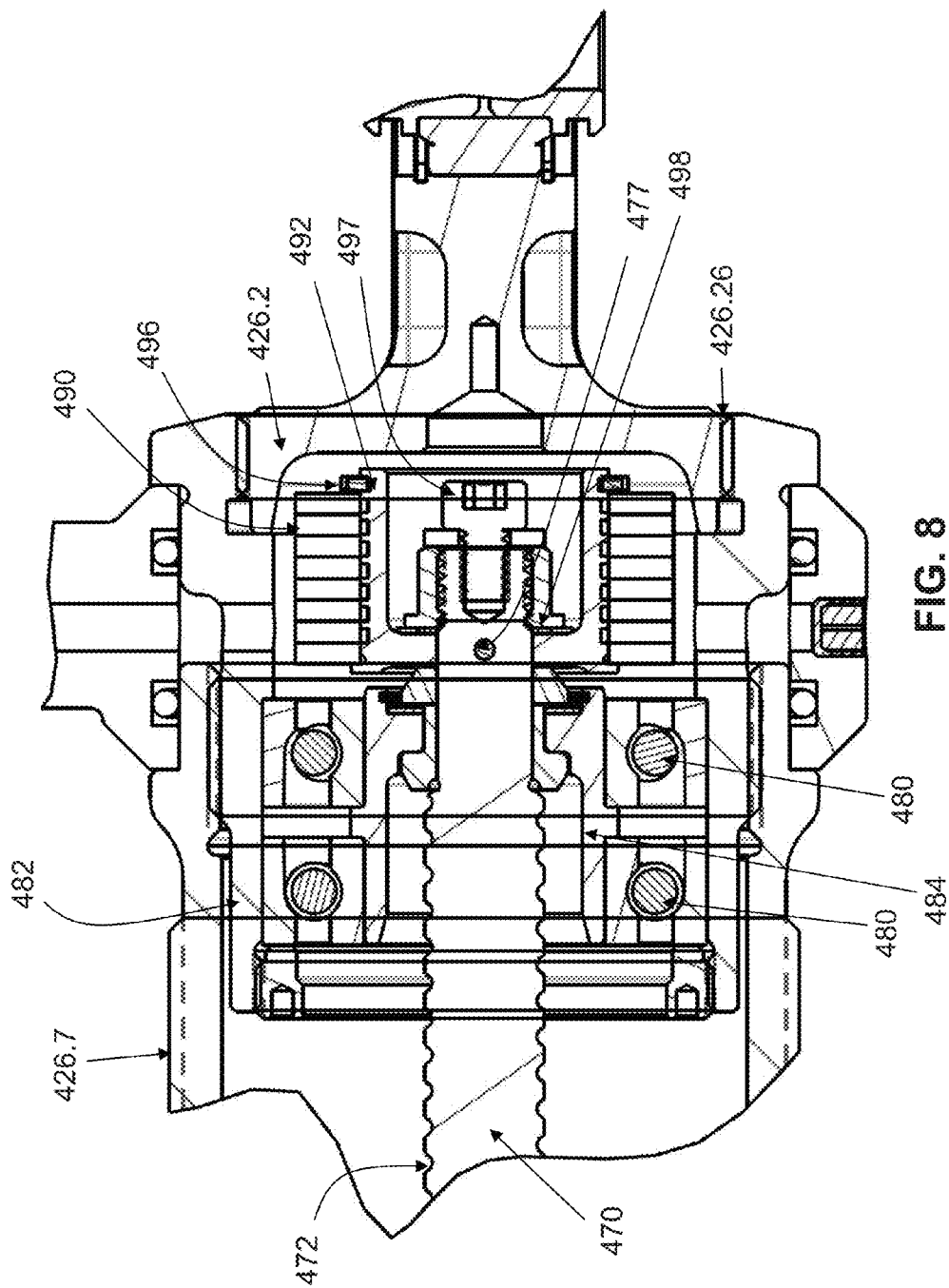
FIG. 8 is an enlargement of a portion of the damper of FIG. 7.

FIGS. 7 and 8 present cutaway views of a damper 400 according to another embodiment of the present invention. In a manner similar to shock 300, shock absorber 400 includes an internal rod 470 that is rotatably supported by a pair of bearing 480 in cylinder 426. In some embodiments, bearing 480 include a pair of ball bearings adapted and configured to provide both low friction support and the ability to react thrust loads, such as longitudinal thrust loads, as a result of the conversion of linear motion to rotary motion by coupling member 460.

As seen in FIG. 7, in some embodiments damper 400 provides a reaction force related primarily to inertia and therefore does not include a piston for viscous damping (such as any of pistons X22). Instead, the distal end of shaft 424 includes a coupling member 460 attached by a housing 462 to the end of the shaft. Coupling member 460, housing 462 and shaft 424 translate within the interior of cylinder 426, but do not rotate. Instead, coupling member 460 provides means for converting relative linear motion into rotational motion of shaft 470, shaft 470 being telescopingly received within an internal passage of rod 424.

FIG. 8 presents an enlargement of a portion of damper 400. It can be seen that a bearing carrier 482 is threadably received within internal threads of cylinder 426. Carrier 482 captures within it a pair of spaced apart ball bearings 480. The inner races of bearing 480 are fixed relative to an inner race carrier 484 that is fixedly attached to, and rotatable with, shaft 470. The end 474 of shaft 470 is coupled by a sheer pin 477 to a rotatable carrier 492. Carrier 492 receives on it in a loose, stacked manner a plurality of substantially identical washer-like weights 490 fabricated from a suitable material, such as tungsten, steel, brass, or other dense materials with sufficient strength to withstand centrifugal loading. Weights 490 are prevented from relative rotation by a plurality of keys 494 that are received within grooves 492.1 of carrier 492 (as best seen in relation to damper 500 on FIG. 9). The stack of weights 490 is held in position by a snap ring 496. Carrier 492 includes a plurality of snap ring grooves. Referring to FIG. 8, if the endmost weight 490 were to be removed, then snap ring 496 would be placed in the next, innermost groove so as to tightly hold the remaining weights 490 in place. Although the use of a lock ring 496 has been shown and described, it is understood that such longitudinal locking of the weights could also be accomplished with locking pins, lock wire, and the like.

Damper 400 includes means for repeatedly attaching and reattaching inertial weights. An endcap 426.2 is received by threads 426.26 by outer bearing race carrier 482. Preferably, this interface between end 426.2 and carrier 482 is sealed, such as by an O-ring. Cap 426.2 can be unscrewed from carrier 482, permitting access to a locking screw 497 that retains a nut 498 on the endmost threads of shafts 470. By removing screw 497, nut 498, and pin 477, carrier 492 and weights 490 can be removed as a unit from damper 400. In addition, and as previously described, it is also possible to remove snap ring 496 while carrier 492 is attached to shaft 470, if it is desired only to remove individual weights, and not to replace the entire carrier.

Figure 9:
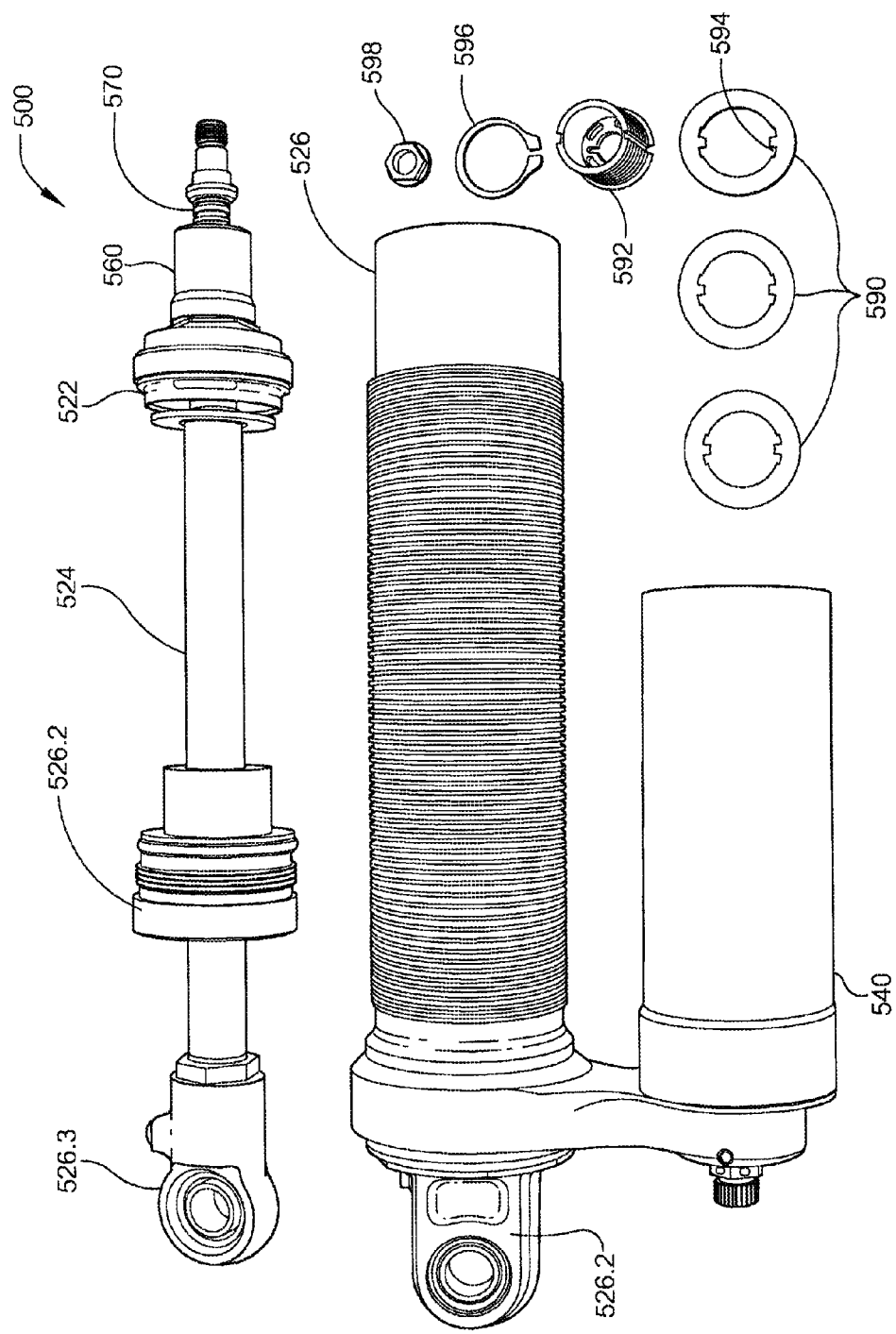
FIG. 9 is a partly disassembled, photographic representation of a suspension damper according to another embodiment of the present invention.
Figure 10:
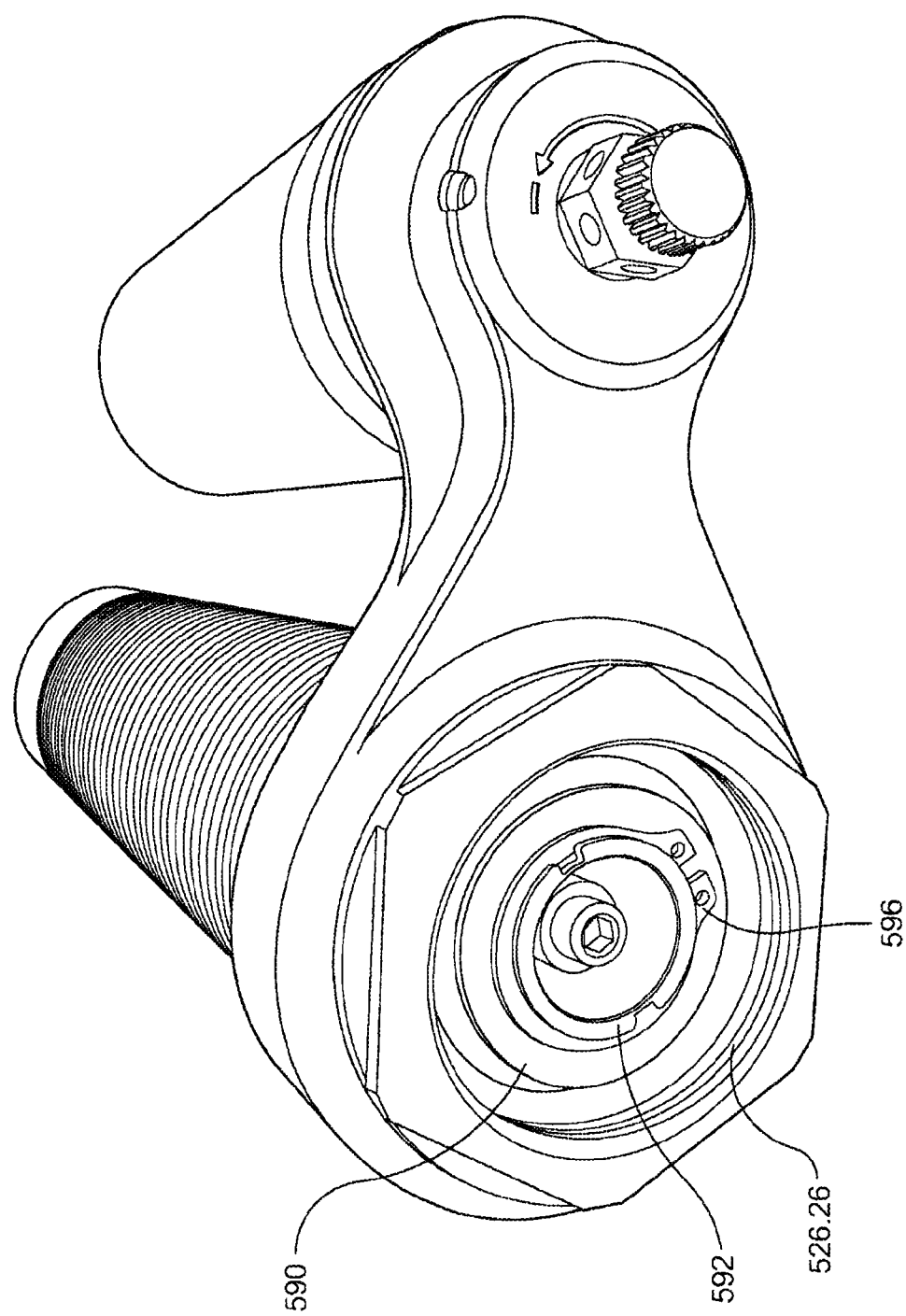
FIG. 10 is an end perspective photographic representation of part of the apparatus of FIG. 9, with a cover removed.
Figure 11:
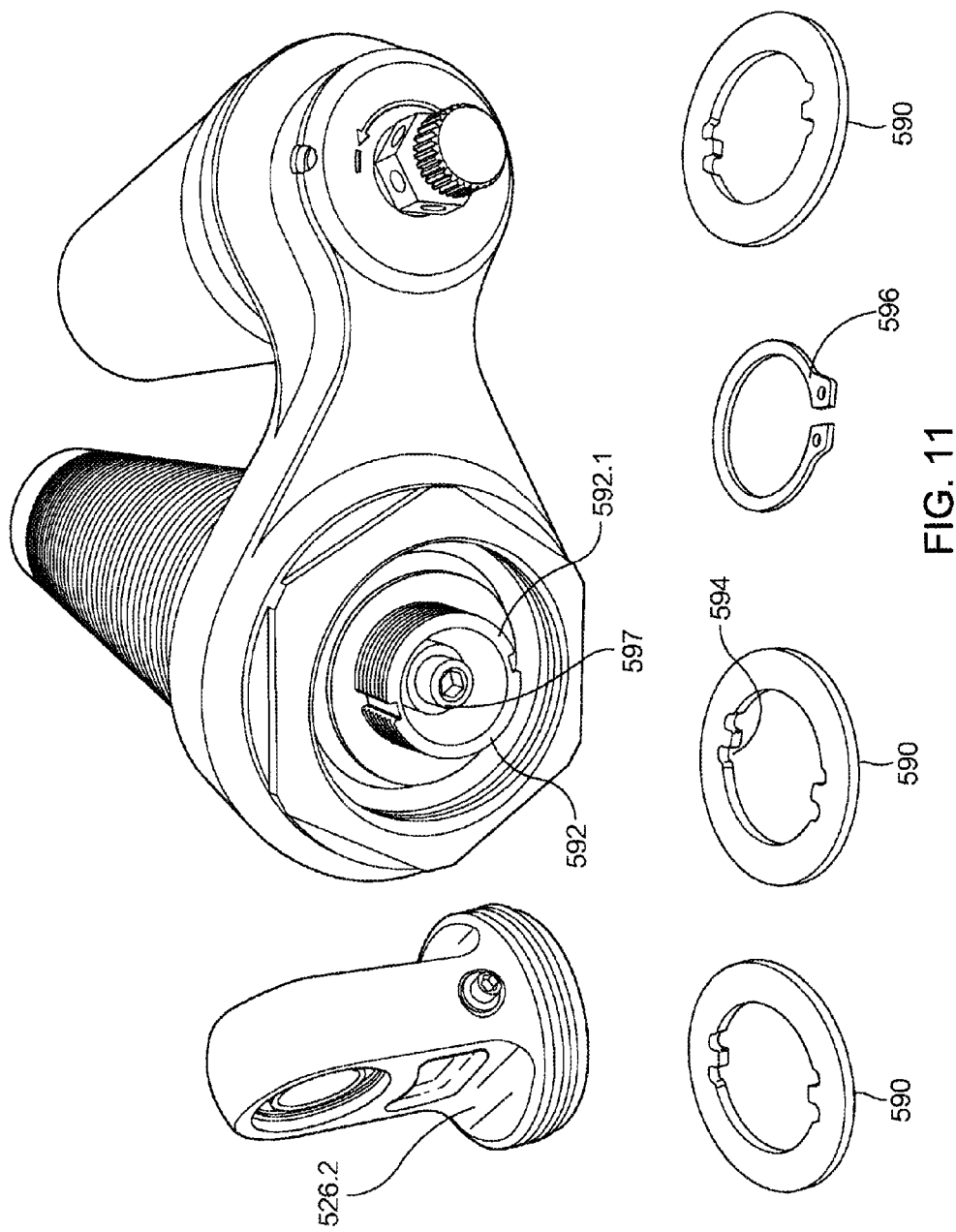
FIG. 11 is a photographic representation of the apparatus of FIG. 10 after further disassembly.
Figure 12:
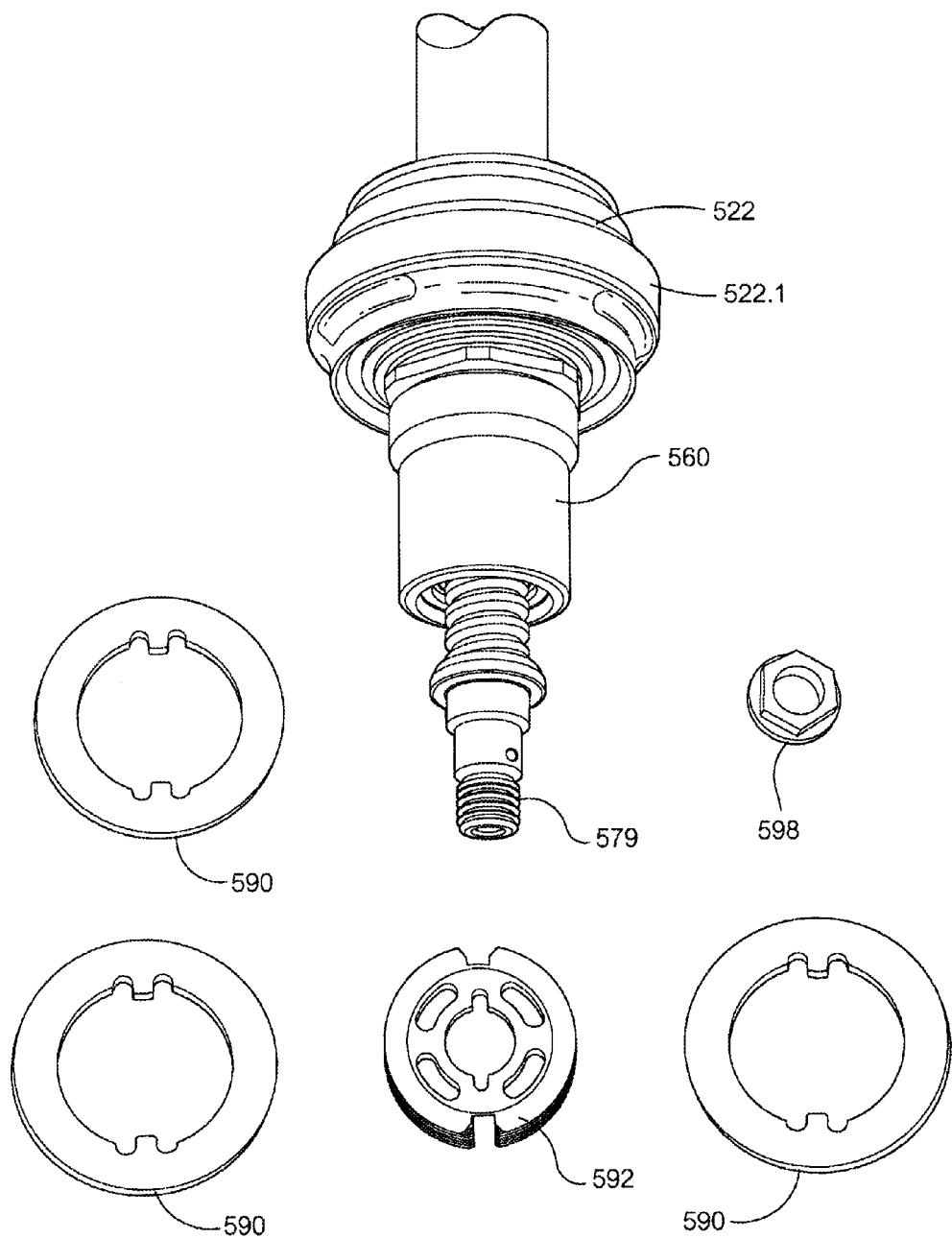
FIG. 12 is a top photographic representation of a portion of the apparatus of FIG. 11, removed from the cylinder.
Figure 13:
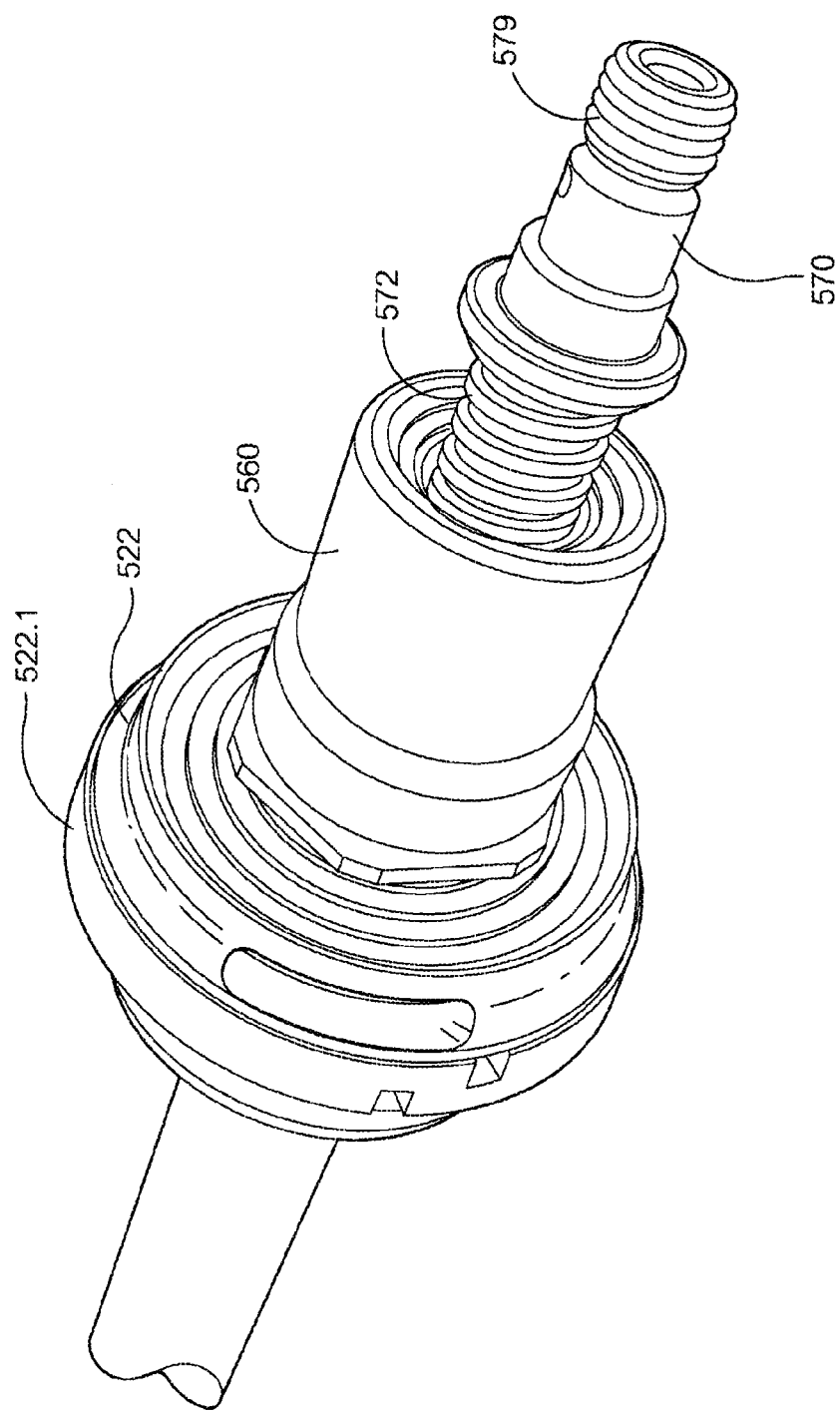
FIG. 13 is a side perspective photographic representation of a portion of the apparatus of FIG. 12.

FIGS. 9-13 are photographic representations of a damper 500, and FIG. 13 is a cutaway perspective of a portion of damper 500, according to another embodiment of the present invention. FIG. 9 shows a shaft 524, endcap 526.2, piston 522, coupling member 560, and shaft 570 inside view. Note that this side view is 180 degrees transposed from how it would be assembled into cylinder 526, shown in the middle of FIG. 9. Cylinder 526 shows a threaded exterior adapted and configured to threadably receive an external spring retainer (not shown). FIG. 10 shows an end view of a complete damper 500, with endcap 526.2 removed. Similar to the view of FIG. 8, removal of this endcap permits access to snap ring 596 and carrier 592.

FIG. 11 shows the removed endcap 526.2. Snap ring 596 has been removed and several weights 590 have been removed from carrier 592. The key 594 that is received within groove 592.1 can be seen on each of these weights, in two, spaced apart locations. FIG. 11 also shows locking screw 597 that can be removed to provide access to nut 598, for removal of carrier 592.

Figure 14:
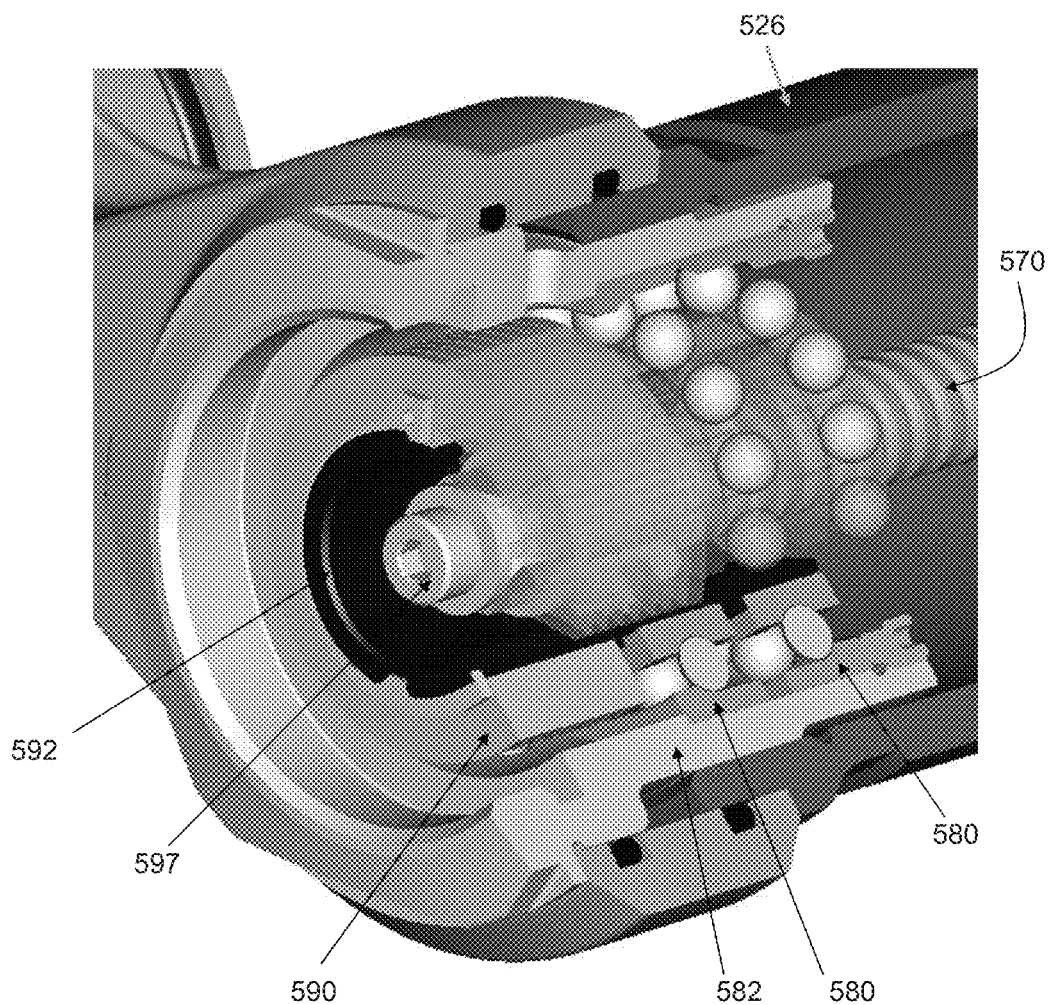
FIG. 14 is a graphical depiction of a side perspective view of a suspension damper according to another embodiment of the present invention.

FIGS. 11, 12, and 13 show various views and components as removed from cylinder 526. FIG. 12 shows a piston 522 and coupling member 560 that have been located close to end 574 of shaft 570. Note that bearings 580, as well as the bearing carriers, have been removed for the sake of clarity. The piston sealing guide 522.1 can be seen on the outer diameter of piston 522. FIG. 14 is a CAD representation of damper 500 during operation.

Various aspects of different embodiments of the present invention are expressed in paragraphs X1, X2, and X3, as follows.

X1. One aspect of the present invention pertains to a hydraulic damper. The damper preferably includes a housing defining a cavity for hydraulic fluid. The damper preferably includes a piston slidable within the cavity and sealingly dividing the cavity into a first volume and a second volume, the piston including means for permitting restricted flow between the first volume and the second volume. The damper preferably includes a first rod linearly slidable relative to the cavity and having an end extending outside of the cavity, the piston being attached to the rod, the first rod having an internal channel. The damper preferably includes a second rod located at a fixed longitudinal position within the housing and adapted and configured to be received within the internal channel. The damper preferably includes a coupling member in contact with the first rod and the second rod. The damper preferably includes means for converting linear motion of the first rod to rotary motion of one of the second rod or the coupling member.

X2. Another aspect of the present invention pertains to a hydraulic damper. The damper preferably includes a cylindrical housing defining a cavity for hydraulic fluid. The damper preferably includes a piston slidable within the cavity and sealingly dividing the cavity into a first volume and a second volume, the piston including at least a portion of a fluid passageway between the first volume and the second volume. The damper preferably includes a first rod linearly slidable relative to the cavity and having an end extending outside of the cavity, the first rod having an internal channel. The damper preferably includes a second rod fixedly attached within the housing and adapted and configured to be received within the internal channel during linear movement of the first rod. The damper preferably includes a coupling member rotatably attached to the first rod and in contact with the second rod The damper preferably includes that the coupling member rotates and fluid flows through the passageway in response to movement of the first rod.

X3. Another aspect of the present invention pertains to a hydraulic damper. The damper preferably includes a cylindrical housing containing hydraulic fluid. The damper preferably includes a piston having two sides and being slidable within the housing, the piston including at least a portion of a fluid passageway for flow of fluid from one side to the other side. The damper preferably includes a first rod linearly slidable relative to the cavity and having an end extending outside of the cavity. The damper preferably includes a second rod rotatably within the housing and adapted and configured to be telescopically coupled to the first rod. The damper preferably includes a coupling member linearly moveable in fixed relationship with the first rod and in contact with the second rod. The damper preferably includes that the second rod rotates and fluid flows through the passageway in response to movement of the first rod relative to the housing.

Yet other embodiments pertain to any of the previous statements X1, X2, or X3, which are combined with one or more of the following other aspects:

Wherein one of the first rod or the second rod is telescopically received within the other.

Wherein the converting means is a ballscrew mechanism,

Wherein the coupling member is a ballscrew nut and the second rod is a ballscrew rod.

Wherein the ballscrew rod is fixedly attached to the housing.

Wherein the ballscrew rod is rotatably coupled to the housing by a bearing.

Wherein the ballscrew nut is rotatably coupled to the piston or to the shaft by a bearing.

Which further comprises a weight coupled to the one of the second rod or the coupling member, the weight being repeatedly couplable and decouplable to the one of the second rod or the coupling member.

Which further comprises a plurality of substantially identical weights coupled to the one of the second rod or the coupling member, the weight being repeatedly couplable and decouplable to the one of the second rod or the coupling member.

Wherein the housing includes a repeatedly removable end cap and a weight rotatable by the converting means, and the weight is accessible within the damper after the end cap is removed.

Wherein the permitting means includes at least one valve for permitting flow with a predetermined flow characteristic.

Wherein the permitting means includes at least one, one-way valve.

Wherein the permitting means is an orifice.

Wherein the damper is coupled to the suspension of a vehicle, and one end of the external rod is coupled to a portion of the vehicle suspension, and the cylinder is coupled to a portion of the vehicle.

Which further comprises a bearing for rotatably supporting the coupling member on the first rod.

Which further comprises a pair of thrust bearings for rotatably supporting the coupling member.

Wherein the second rod includes an external spiral groove.

Wherein the rotation of the coupling member is guided by the groove.

Wherein the coupling member is wetted with hydraulic fluid.

Wherein the housing has a longitudinal axis, and the first rod and the second rod are concentric about the axis.

Wherein the piston is fixedly attached to the first rod.

Wherein the second rod is received within a passage of the first rod.

Wherein the coupling member includes an outer member and a plurality of recirculating balls, the balls being in contact with the second rod.

Wherein the coupling member is attached to the first rod.

Wherein the second rod is bearingly supported within the housing.

Wherein a pair of ball bearings support the second rod.

Wherein the second rod is wetted with hydraulic fluid.

Wherein the coupling member is in a cavity sealed from hydraulic fluid. While the inventions have been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

What is claimed is:

1. A hydraulic damper, comprising:
   a housing defining a cavity for hydraulic fluid;
   a piston slidable within the cavity and including a peripheral seal dividing the cavity into a first volume and a second volume;
   a first rod linearly slidable relative to said cavity and having an end extending outside of the cavity, said piston being attached to said first rod, said first rod having an internal channel;
   a second rod located at a position within said housing and adapted and configured to be received within the internal channel; and;
   a coupling member in contact with said first rod and said second rod;
   wherein linear motion of said first rod is converted to rotary motion of one of said second rod or said coupling member.

2. The damper of claim 1 wherein said converting means is a ballscrew mechanism, wherein said coupling member is a ballscrew nut and said second rod is a ballscrew rod.

3. The damper of claim 2 wherein said ballscrew rod is fixedly attached to said housing.

4. The damper of claim 2 wherein said ballscrew rod is rotatably coupled to said housing by a bearing.

5. The damper of claim 2 wherein said ballscrew nut is rotatably coupled to said piston or to said shaft by a bearing.

6. The damper of claim 1 wherein one of said first rod or said second rod is telescopically received within the other.

7. The damper of claim 1 which further comprises a weight coupled to the one of said second rod or said coupling member, said weight being repeatedly couplable and decouplable to the one of said second rod or said coupling member.

8. The damper of claim 1 which further comprises a plurality of substantially identical weights coupled to the one of said second rod or said coupling member, said weight being repeatedly couplable and decouplable to the one of said second rod or said coupling member.

9. The damper of claim 1 wherein said housing includes a removable end cap and a rotatable weight attached to the one of said second rod or said coupling member, and said weight is accessible within said damper after said end cap is removed, said rotatable weight being adapted and configured with inertial characteristics such that rotation of said weight provides a reactive inertial force in response to movement of said first rod relative to said cavity.

10. The damper of claim 1 which further comprises means for permitting restricted flow between the first volume and the second volume that includes at least one valve for permitting flow with a predetermined flow characteristic.

11. The damper of claim 1 which further comprises at least one, one-way valve permitting restricted flow between the first volume and the second volume.

12. The damper of claim 1 which further comprises an orifice permitting flow between the first volume and the second volume.

13. The damper of claim 1 wherein said damper is coupled to the suspension of a vehicle, and one end of said external rod is coupled to a portion of the vehicle suspension, and said cylinder is coupled to a portion of the vehicle.

14. The damper of claim 1 which further comprises a bearing for rotatably supporting the one of said second rod or said coupling member.

15. The damper of claim 1 wherein said housing has a longitudinal axis, and said rod and said second rod are concentric about the axis.

16. A hydraulic damper, comprising:
   a cylindrical housing defining a cavity for hydraulic fluid;
   a piston slidable within the cavity and dividing the cavity into a first volume and a second volume;
   a first rod linearly slidable relative to said cavity and having an end extending outside of the cavity, said first rod having an internal channel;

a second rod fixedly attached within said housing and adapted and configured to be received within the internal channel during linear movement of said first rod;

a coupling member rotatably attached to said first rod and in contact with said second rod wherein said coupling member rotates in response to movement of said first rod relative to said housing.

17. The damper of claim 16 wherein said second rod includes an external spiral groove.

18. The damper of claim 17 wherein the rotation of said coupling member is guided by the groove.

19. The damper of claim 16 wherein said coupling member is wetted with hydraulic fluid.

20. The damper of claim 16 wherein said housing has a longitudinal axis, and said first rod and said second rod are concentric about the axis.

21. The damper of claim 16 wherein said piston is fixedly attached to said first rod.

22. The damper of claim 16 which further comprises a bearing for rotatably supporting said coupling member on said first rod.

23. The damper of claim 16 which further comprises a pair of thrust bearings for rotatably supporting said coupling member.

24. The damper of claim 16 wherein said piston is attached to said first rod, and said coupling member is adapted and configured to have inertial characteristics such that said damper provides primarily a reactive inertial force in response to movement of said first rod relative to said cavity.

25. A hydraulic damper, comprising:

a cylindrical housing containing hydraulic fluid;

a piston having two sides and being slidable within said housing;

a first rod linearly slidable relative to said cavity and having an end extending outside of the cavity;

a second rod rotatable within said housing and adapted and configured to be telescopically coupled to said first rod;

a coupling member linearly moveable in fixed relationship with said first rod and in contact with said second rod wherein said second rod rotates in response to movement of said first rod relative to said housing.

26. The damper of claim 25 wherein said second rod is supported within said housing by a bearing.

27. The damper of claim 26 wherein a pair of ball bearings support said second rod.

28. The damper of claim 25 wherein said second rod is wetted with hydraulic fluid.

29. The damper of claim 25 wherein said coupling member is attached to said first rod.

30. The damper of claim 25 wherein said coupling member is a ballscrew nut and said second rod is a ballscrew rod.

31. The damper of claim 25 wherein said damper is coupled to the suspension of a vehicle, and the external end of said first rod is coupled to a portion of the vehicle suspension, and said cylinder is coupled to a portion of the vehicle.

32. The damper of claim 25 wherein said housing includes a removable end cap and a removable inertia weight rotatable by said second rod, wherein removing said end cap provides access to remove said weight.

33. The damper of claim 25 wherein said second rod is received within a passage of said first rod.

34. The damper of claim 25 wherein said coupling member includes an outer member and a plurality of recirculating balls, said balls being in contact with said second rod.

* * * * *